（12） United States Patent
Stark

(10) Patent No.: US 10,878,269 B2
(45) Date of Patent: Dec. 29, 2020

(54) DATA EXTRACTION USING NEURAL NETWORKS

(71) Applicant: SAP SE, Walldorf (DE)

(72) Inventor: Michael Stark, Bellevue, WA (US)

(73) Assignee: SAP SE, Walldorf (DE)

( * ) Notice: Subject to any disclaimer, the term of this patent is extended or adjusted under 35 U.S.C. 154(b) by 83 days.

(21) Appl. No.: 16/012,546

(22) Filed: Jun. 19, 2018

(65) Prior Publication Data

US 2019/0385001 A1   Dec. 19, 2019

(51) Int. Cl.
*G06K 9/62*   (2006.01)
*G06K 9/18*   (2006.01)
*G06K 7/10*   (2006.01)
*G06K 9/34*   (2006.01)
*G06N 3/04*   (2006.01)
*G06K 9/74*   (2006.01)

(52) U.S. Cl.
CPC .......... *G06K 9/344* (2013.01); *G06K 9/6201* (2013.01); *G06K 9/74* (2013.01); *G06N 3/0472* (2013.01)

(58) Field of Classification Search
USPC ................... 382/156, 182, 224, 321
See application file for complete search history.

(56) References Cited

U.S. PATENT DOCUMENTS

| 8,095,530 | B1 | 1/2012 | Lloyd |
| 8,953,885 | B1 | 2/2015 | Och et al. |
| 10,417,788 | B2 | 9/2019 | Risman et al. |
| 10,650,230 | B2 | 5/2020 | Johnson |
| 2007/0065003 | A1* | 3/2007 | Kellerman ........... G06K 9/6835 382/159 |
| 2011/0211759 | A1* | 9/2011 | Park .......................... G06K 9/48 382/182 |
| 2014/0023273 | A1 | 1/2014 | Baheti et al. |
| 2015/0339525 | A1 | 11/2015 | Marcelli et al. |

(Continued)

OTHER PUBLICATIONS

Dzmitry Bahdanau et al, "Neural Machine Translation by Jointly Learning to Align and Translate," in ICLR 2015, May 19, 2016, 15 pages.

(Continued)

*Primary Examiner* — Kathleen Y Dulaney
(74) *Attorney, Agent, or Firm* — Fountainhead Law Group P.C.

(57) ABSTRACT

Embodiments of the present disclosure pertain to extracting data corresponding to particular data types using neural networks. In one embodiment, a method includes receiving an image in a backend system, sending the image to an optical character recognition (OCR) component, and in accordance therewith, receiving a plurality of characters recognized in the image, sequentially processing the characters with a recurrent neural network to produce a plurality of outputs for each character, sequentially processing the plurality of outputs for each character with a masking neural network layer, and in accordance therewith, generating a first plurality of probabilities, wherein each probability corresponds to a particular character in the plurality of characters, selecting a second plurality of adjacent probabilities from the first plurality of probabilities that are above a threshold, and translating the second plurality of adjacent probabilities into output characters.

20 Claims, 5 Drawing Sheets

(56) References Cited

U.S. PATENT DOCUMENTS

| | | |
|---|---|---|
| 2017/0109573 A1 | 4/2017 | Collet et al. |
| 2018/0025256 A1 | 1/2018 | Bai et al. |
| 2019/0130213 A1 | 5/2019 | Shazeer et al. |
| 2019/0130578 A1 | 5/2019 | Gulsun et al. |
| 2019/0147304 A1* | 5/2019 | Liu .................. G06K 9/628 382/157 |
| 2019/0266474 A1* | 8/2019 | Stark .................. G06N 3/08 |
| 2019/0279035 A1 | 9/2019 | Bluche |
| 2019/0385001 A1 | 12/2019 | Stark |
| 2020/0042591 A1 | 2/2020 | Aguiar et al. |

OTHER PUBLICATIONS

Ilya Sutskever et al, "Sequence to Sequence Learning with Neural Networks," Dec. 14, 2014, 9 pages.

Jiang Wang et al, "CNN-RNN: A Unified Framework for Multi-label Image Classification," Cornell University Library, Apr. 15, 2016, 10 pages.

Yuntian Deng et, "Image-to-Markup Generation with Coarse-to-Fine Attention," Proceedings of the 34th International Conference on Machine Learning, Jun. 13, 2017, Sydney, Australia, 10 pages.

Andrej Karpathy et al., Deep Visual-Semantic Alignments for Generating Image Descriptions, CVPR 2015 Conference, Jun. 8-12, 2015, 17 pages.

Yann Lecun et al., "Convolutional Networks for Images, Speech, and Time-Series," Handbook of Brain Theory and Neural Networks. MIT Press, published Jun. 1995, 14 pages.

Related Unpublished U.S. Appl. No. 16/880,616, filed May 21, 2020.

\* cited by examiner

DATA EXTRACTION USING NEURAL NETWORKS

BACKGROUND

The present disclosure relates to data extraction, and in particular, to extracting data using neural networks.

The proliferation of cameras and other electronic image capture devices has led to massive growth in the availability of images. For example, cameras can be found on almost all mobile devices, and such ready access to a camera allows users to capture an ever increasing amount of electronic images. Interestingly, images often contain data, and such data can be useful for a wide range of applications. However, extracting data from an image is no simple task. For example, an image of a receipt may include different data types about a variety of topics, including purchaser information, credit card information, vendor information, and the like. However, accurately extracting types of data from the image is challenging. Accordingly, it would be advantageous to discover improved techniques for extracting data from electronic images.

SUMMARY

Embodiments of the present disclosure pertain to extracting data corresponding to particular data types using neural networks. In one embodiment, a method includes receiving an image in a backend system, sending the image to an optical character recognition (OCR) component, and in accordance therewith, receiving a plurality of characters recognized in the image, sequentially processing the characters with a recurrent neural network to produce a plurality of outputs for each character, sequentially processing the plurality of outputs for each character with a masking neural network layer, and in accordance therewith, generating a first plurality of probabilities, wherein each probability corresponds to a particular character in the plurality of characters, selecting a second plurality of adjacent probabilities from the first plurality of probabilities that are above a threshold, and translating the second plurality of adjacent probabilities into output characters.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
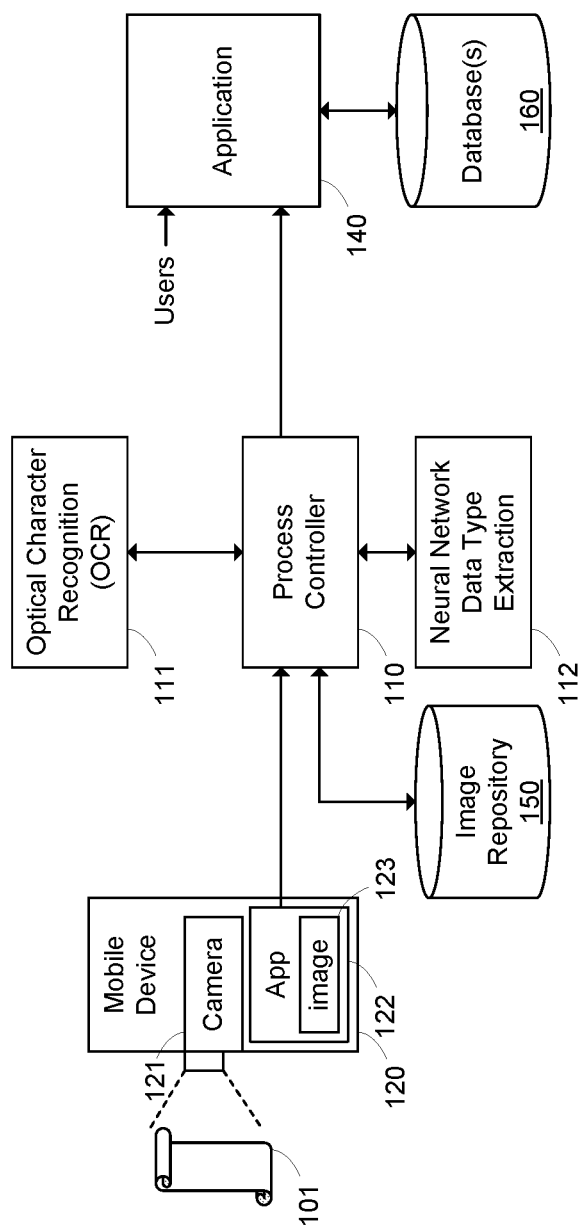
FIG. 1 illustrates an architecture for extracting data from an image according to one embodiment.

FIG. 1 illustrates an architecture for extracting data from an image according to one embodiment. As used herein, an "image" refers to an electronic image, which may include electronic photographs or pictures stored in one of a variety of digital formats, for example. As illustrated in FIG. 1, a mobile device 120 may include a camera 121. Camera 121 may be used to take a picture and create an image 123, which may be stored on mobile device 120. The following description uses an example image of a receipt 101 captured on a mobile device 120 to describe various aspects of the disclosure. However, it is to be understood that this is not the only embodiment that may use the features and techniques described herein. In this example, mobile device 120 includes an application 122 (aka "App"), which, when accessed, automatically accesses the camera. In one embodiment, the App may be an "Expense App" that includes functionality for accessing the camera to take a picture of a receipt and sending the image to a backend system, for example.

In this example, the image 123 is sent to a backend software system that includes functionality for extracting data corresponding to particular data types (or patterns) from the image. The backend software system may include a process controller component 110, an optical character recognition (OCR) component 111, image repository 150, a neural network data type extraction component 112, an application 140, and one or more databases 160. In this example, process controller 110 may receive images from App 123, via email, or through a variety of other image transfer mechanisms (e.g., text, links, etc. . . . ). Process controller 110 may control storing images in repository 150, sending images to OCR component 111, sending characters from the OCR to extraction component 112, and forward extracted data to application 140 and database 160, which process and store the data, respectively, so users can interact with the data through application 140, for example. In one embodiment, the image is a receipt, and the application is an Expense Application, for example. Process controller 110 may send an image to OCR component 111, and the OCR component 111 may return characters from the image, for example. Neural network data type extraction component 112 may extract blocks of contiguous characters from the returned OCR character set that have a particular data type (or data pattern), such as a vendor name, street address, purchaser name, or the like, for example. The output characters extracted from the image are then stored in application 140 and/or database 160.

Figure 2:
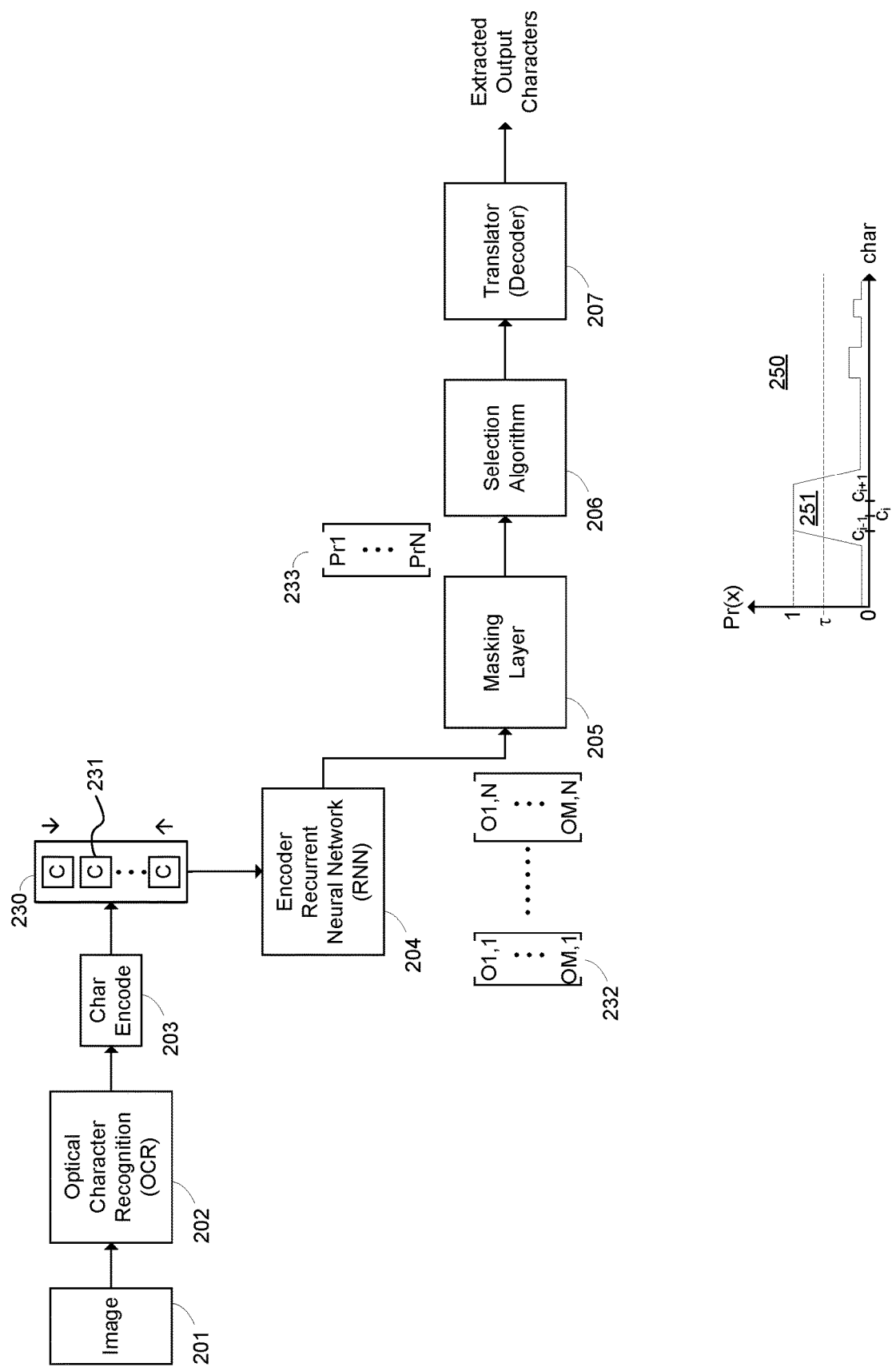
FIG. 2 illustrates an architecture of a neural network for extracting types of data.

FIG. 2 illustrates an architecture of a neural network for extracting types of data. In this example, an image 201 may be received in a backend system, for example. The image is sent to an optical character recognition (OCR) system 202, and in accordance therewith, a plurality of characters recognized in the image are received. In some embodiments, OCR 202 may be provided by a third-party software provider on a remote system, for example. OCR 202 may be used to process a wide range of images to produce a wide range of character sets. In one example embodiment, the character set corresponds to a transaction receipt, for example, but the techniques disclosed herein may be used for other character sets from other images. As mentioned above, the characters may be encoded so that different characters within the character set are encoded differently.

Coding may be performed by OCR 202 or by a character encoder 203. For example, a character set may include upper and lower case letters, numbers (0-9), and special characters, each represented using a different character code. In one example encoding, each type of character in a character set (e.g., A, b, Z, f, $, 8, blank space, etc. . . . ) has a corresponding array, and each array comprises all zeros and a single one (1) value. For example, the word "dad" may be represented as three arrays as follows: d=[0, 0, 0, 1, 0, . . . , 0]; a=[1, 0, . . . , 0]; d=[0, 0, 0, 1, 0, . . . , 0]. It is to be understood that other techniques for coding the characters as numeric values may be used in other implementations. Accordingly, each character in a plurality of characters received from an OCR system is represented by one or more values, and the values may be input to the recurrent neural network one at a time.

Features and advantages of the present disclosure include training an encoder RNN 204 and a masking layer 205 to receive an input character set 230 and generate probabilities that correspond to data types (i.e., data patterns), which can then be identified and extracted from an image that may comprise multiple different data types. For example, the image may be an image of a receipt, and the data types may comprise a purchaser name, a vendor name, a vendor street address, a vendor city, a Tax ID, an invoice number, a last 4 digits of credit-card number, or a vendor phone number, for example.

In one embodiment, the characters in an input character set 230 may be sequentially processed with RNN 204 to produce a plurality of outputs 232 for each character. Each output generated by RNN 204 in response to a different input character may comprise M values (where M is an integer), where M may correspond to the number of values used in a numeric coding of each character, for example. Thus, each output may be referred to as an output vector, for example. Thus, for N characters in an input character set, RNN 204 may generate N output vectors (where N is an integer), for example.

In the example in FIG. 2, the encoded input character set may be ordered. For example, characters for a receipt or other readable document may be ordered starting from left to right and top to bottom. Thus, for an input character set 230 having a total of N characters, there will be N positions in the character set. In this example, there are N encoded character arrays of values 231 for input character set 230, which are ordered 1 . . . N. In this example, input character set 230 may be provided as an input to an encoder recurrent neural network (RNN) 204, for example. In one embodiment, RNN 204 is a bidirectional RNN comprising a first RNN that receives the encoded input characters 230 in order 1 . . . N (first to last) and a second RNN that receives the encoded input characters 230 in reverse order N . . . 1 (last to first), for example. Bidirectional RNNs may advantageously improve the accuracy of the probabilities generated, for example.

Output vectors 232 are sequentially processed with a masking neural network layer 205. In some example applications, the difference between the RNN and the masking layer is that the RNN is trained to produce an array of values for each character, which will cause the masking layer to output a meaningful probability. The RNN may do this by combining its weights with the input encoded character and an array of values representing its state after encoding the previous character, for example. The RNN may rely on the characters being passed through it in the correct order (e.g., both forward and in reverse). The masking layer may combine its weights with the array output by the RNN corresponding to each character to translate the RNN output into probabilities. Accordingly, a plurality of probabilities 233 may be generated, where each probability (Pr) corresponds to a particular character in the input character set, for example (e.g., Pr1~C1, Pr2~C2, . . . PrN~CN). Masking layer 205 may perform a dot product of each output vector 232 with a weight set to produce each probability, Pr, corresponding to a particular character, for example. The probabilities, Pr, may comprise values between zero (0) and one (1), for example. When the RNN 204 and masking layer 205 are trained, the system is able to detect data types in the input character set. For example, graph 250 shows probabilities generated in response to an example character set. The probabilities are zero or nearly zero until a data type pattern is detected. When the data type pattern is detected, the probabilities increase to one or nearly one as the characters having the data type pattern sequence are processed. Accordingly, masking layer 205 may output a plurality of adjacent probabilities with values of one or nearly one, for example. The position of the probabilities that are one or nearly one in the probability array 233 corresponds to the position of the characters in the input character set. Thus, the characters of the pattern may be determined. FIG. 2 illustrates a plurality of adjacent probabilities comprising a contiguous set of probability values near one (1) at 251, which may be used to identify the characters of a data type, for example. As described in more detail below, multiple RNNs 204 and masking layers 205 may be trained to detect different patterns, and the same character set may be analyzed to extract different characters for different data types from the same image, for example.

Probabilities 233 may be input to a selection algorithm 206 to determine which probabilities correspond to a data type pattern. For example, selection algorithm 206 may select adjacent probabilities (e.g., probabilities 251) from the array of probabilities 233 that are above a threshold, $\tau$. As mentioned above, the output of the masking layer neural network is a sequence of values between 0 and 1 representing the probability that each character in the input set is part of the data type to be extracted. Ideally, this is a list of values very near zero with a short, contiguous, collection of values near 1 where the data type is recognized. In this case, the values close to 1 indicate the characters of the input character set that are part of the extraction. In some cases, however, there may be values at the ends of the contiguous group of values near 1 that are intermediate (e.g., 0.4, 0.5, 0.6, etc.). In that case, the system may include fewer or additional characters at either end of the group of characters with high values to accurately identify a data type. For example, in one embodiment, the system may detect one or more probabilities on first and second ends of the contiguous set of values near one having intermediate values, extract characters corresponding to the contiguous set of probability values and extract one or more additional characters corresponding to one or more probability values before or after the contiguous set of probability values, and compare the extracted characters against a data type format (e.g., a template) to determine if the extracted characters match the data type format. The system may increase or decrease the number of characters before or after the contiguous set to be extracted until the extracted characters match the data type format.

For example, trial extractions may be made by including fewer or additional characters beyond either end of the group of characters with high values. These extractions are each checked against the expectation of the format of the information the model was trained to extract. For example, if the model has been trained to extract a street address, the trial extractions are checked to see if they have the form of an address. They can additionally be checked against a database of possible addresses, for example. If the model has been trained to extract tax ID numbers, the trial extractions may be checked to see if they are valid values. Of the trial extractions, the one that has the highest probability of being a valid value is returned as the result. In one example embodiment, trial extractions are made adding or subtracting one character or a small collection of characters (e.g. a "word" separated by spaces) until a string matching the expected pattern is found. In the case of multiple trial extractions matching the expected pattern, one can be selected based on the calculated probabilities. For example, the system may select the pattern that includes the most characters above some threshold probability and the fewest below that threshold. In the case of no trial extraction matching the pattern, just those characters above the threshold may be returned.

Once characters meeting the criteria of the data type to be extracted have been identified, the adjacent probabilities are translating into output characters using translator 207. As mentioned above, a position of each probability in the N×1 probability array 233 correspond to positions of characters in the N×1 character array 230. Thus, for example, an index of each selected probability in array 233 may be used to retrieve a corresponding character from array 230. The selected characters are also adjacent and form a contiguous character set having a particular data type—an address, a vendor name, etc. . . . . As mentioned above, the characters 231 in input character set 230 may be encoded as values. Accordingly, translator 207 may further decode these values and produce the corresponding character. The translated characters are then produced as an output and may be stored in an application memory and/or in a database, for example.

Figure 3:
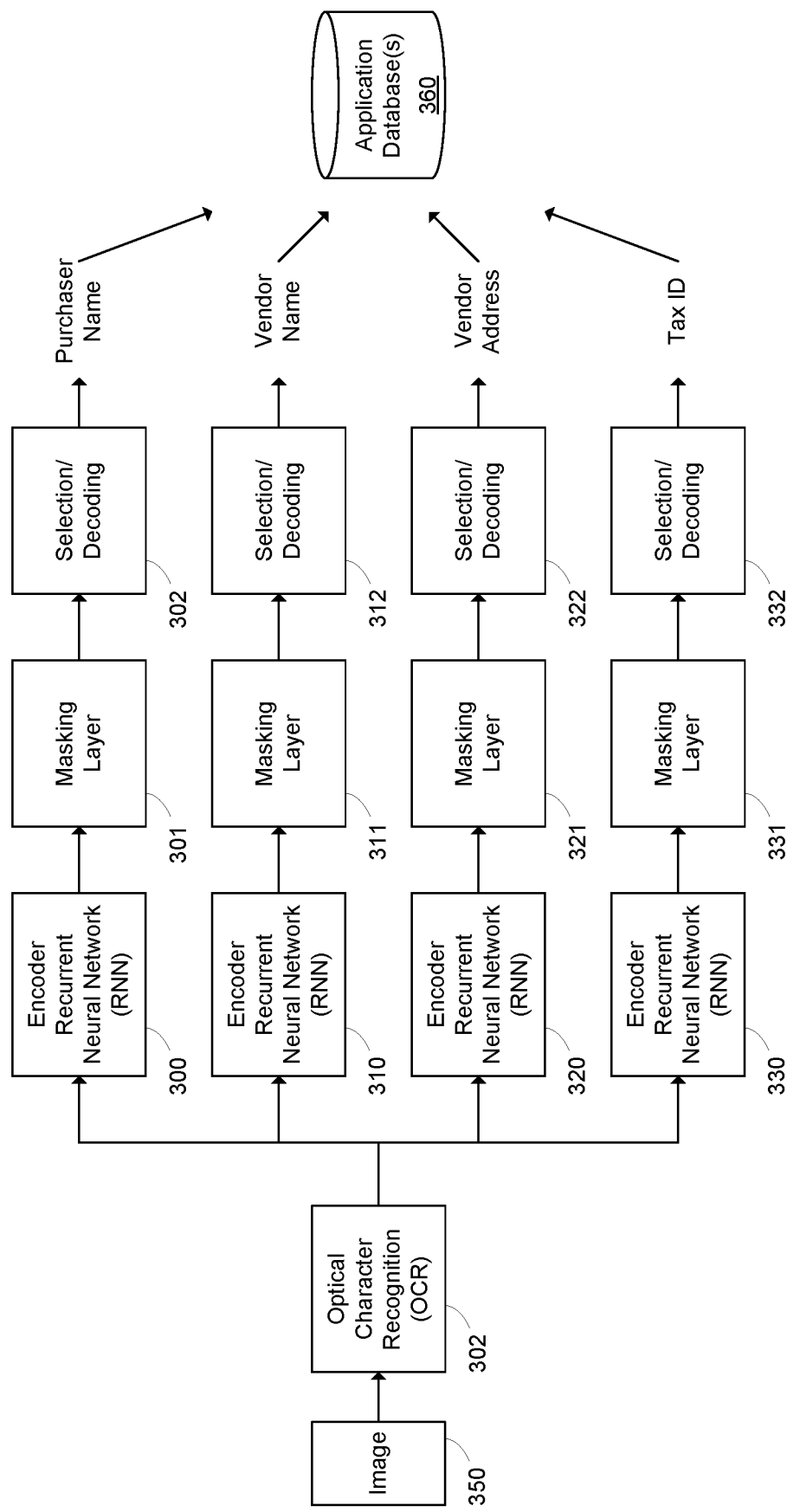
FIG. 3 illustrates extracting multiple data types using neural networks according to another embodiment.

FIG. 3 illustrates extracting multiple data types using neural networks according to another embodiment. Features and advantages of the present disclosure include extracting multiple different data types from the same input image. For example, an image 350 may be a receipt including a purchaser name, vendor name, vendor address, and tax identification (Tax ID). The image is sent to an OCR system 302, which may return an ordered set of characters (e.g., recognized characters ordered from left to right and top to bottom). The ordered set of input characters may be encoded as numeric values, for example, and input to a plurality of neural networks trained to extract different data types. For example, the input characters may be received by encoder RNN 300 and masking layer 301, which have been trained to extract a purchaser name data type. Probabilities generated for each character may be selected and translated to output a purchaser name (if found). Similarly, the input characters may be received by encoder RNN 310 and masking layer 311, which have been trained to extract a vendor name data type. Probabilities generated for each character may be selected and translated to output a vendor name (if found). Likewise, a vendor address and taxID may be extracted from the input characters using encoder RNN 320 and masking layer 321, which have been trained to extract a vendor address data type, and encoder RNN 330 and masking layer 331, which have been trained to extract a taxID data type. Probabilities generated for each character may be selected and translated to output a vendor address and taxID, respectively (if found).

Figure 4:
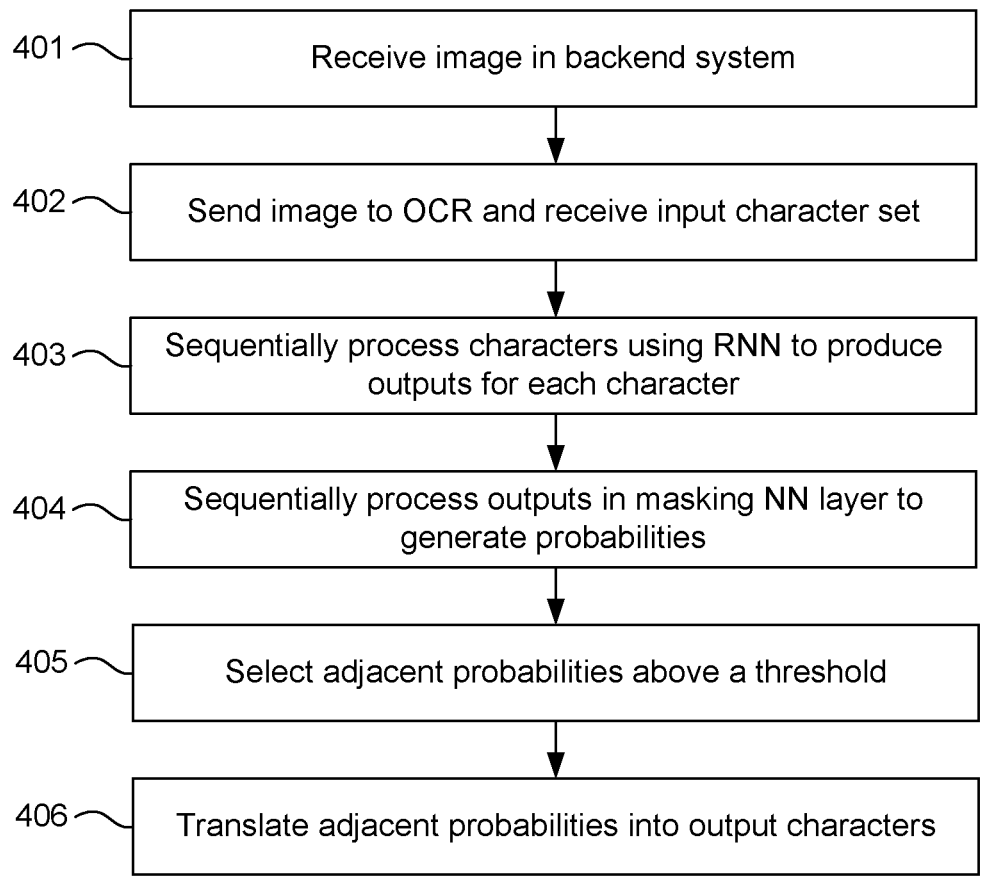
FIG. 4 illustrates a process of extracting types of data using a neural network according to an embodiment.

FIG. 4 illustrates a process of extracting types of data using a neural network according to an embodiment. At 401, an image is received in a backend system. At 402, the image is sent to an optical character recognition (OCR) component, and in accordance therewith, a plurality of characters recognized in the image are received. At 403, the characters are sequentially processed with a recurrent neural network to produce a plurality of outputs for each character. At 404, the plurality of outputs for each character are sequentially processed with a masking neural network layer, and in accordance therewith, a first plurality of probabilities are generated. Each probability corresponds to a particular character in the plurality of characters, for example. At 405, a second plurality of adjacent probabilities that are above a threshold are selected from the first plurality of probabilities. At 406, the second plurality of adjacent probabilities are translated into output characters. The output characters extracted from the image may be stored in an application or database based on the data type. For example, a purchaser name data type may be stored in a name field of a data record, vendor name may be stored in a vendor name field of the data record, a vendor address may be stored in a vendor address field of the data record, and a tax ID may be stored in a taxID field of the data record, and then the data record may be stored in a database.

Example Hardware

Figure 5:
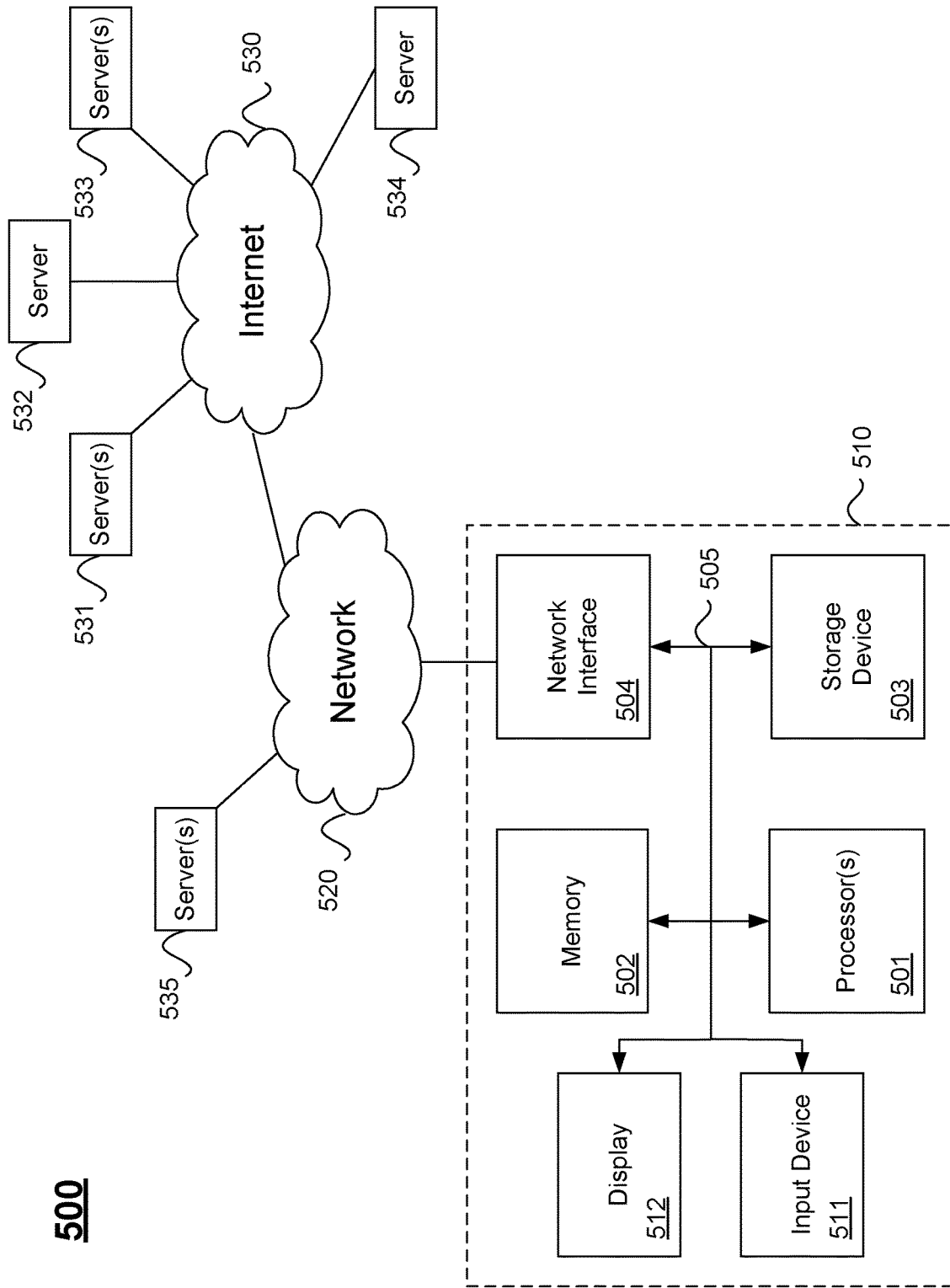
FIG. 5 illustrates computer system hardware configured according to the above disclosure.

FIG. 5 illustrates computer system hardware configured according to the above disclosure. The following hardware description is merely one illustrative example. It is to be understood that a variety of computers topologies may be used to implement the above described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes a memory 502 coupled to bus 505 for storing information and instructions to be executed by processor 501. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device 503 and memory 502 are both examples of non-transitory computer readable storage mediums.

Computer system 510 may be coupled via bus 505 to a display 512 for displaying information to a computer user. An input device 511 such as a keyboard, touchscreen, mouse and/or camera is coupled to bus 505 for communicating information and command selections from the user to processor 501. The combination of these components allows the user to communicate information with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a browser or local application, for example, may access data and features on back-end software systems that may reside on multiple different hardware servers on-prem 535 or across the Internet 530 on servers 531-534. One or more of servers 531-534 may also reside in a cloud computing environment, for example. Such servers may also comprise hardware such as memory, one or more processors, storage devices, and a network interface similar to computer 510, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer implemented method comprising:
    receiving an image in a backend system;
    sending the image to an optical character recognition (OCR) component, and in accordance therewith, receiving a plurality of characters recognized in the image;
    sequentially processing the characters with a recurrent neural network to produce a plurality of outputs for each character;
    sequentially processing the plurality of outputs for each character with a masking neural network layer, and in accordance therewith, generating a first plurality of probabilities, wherein each probability corresponds to a particular character in the plurality of characters; and
    selecting a second plurality of adjacent probabilities from the first plurality of probabilities that are above a threshold; and
    translating the second plurality of adjacent probabilities into output characters.

2. The method of claim 1 wherein the output characters correspond to one of a plurality of different data types in the image.

3. The method of claim 2 wherein the image is a receipt, and wherein the data types comprise one of a purchaser name, a vendor name, a vendor street address, a vendor city, a Tax ID, an invoice number, a last 4 digits of credit-card number, or a vendor phone number.

4. The method of claim 1 wherein each character in the plurality of characters is represented by one or more values, and wherein the values are input to the recurrent neural network one at a time.

5. The method of claim 1 wherein recurrent neural network is a bidirectional recurrent neural network comprising a first recurrent neural network and a second recurrent neural network, wherein the plurality of characters comprise an ordered set having a first character, a last character, and a plurality of intermediate characters, wherein the first recurrent neural network of the bidirectional recurrent neural network receives characters sequentially starting with the first character to the last character, and wherein the second recurrent neural network of the bidirectional recurrent neural network receives characters sequentially starting with the last character to the first character.

6. The method of claim 1 wherein each character processed by the recurrent neural network produces an output vector, and wherein the masking layer performs a dot product of each output vector with a weight set to produce said each probability corresponding to a particular character.

7. The method of claim 1 wherein the first plurality of probabilities comprise values between zero (0) and one (1), and wherein the second plurality of adjacent probabilities comprise a contiguous set of probability values near one (1).

8. The method of claim 7 further comprising:
    detecting one or more probabilities on first and second ends of the contiguous set of values near one having intermediate values;
    extracting characters corresponding to the contiguous set of probability values and corresponding to one or more probability values before or after the contiguous set of probability values;
    comparing the extracted characters against a data type format to determine if the extracted characters match the data type format; and
    increasing or decreasing a number of characters before or after the contiguous set to be extracted until the extracted characters match the data type format.

9. A non-transitory machine-readable medium storing a program executable by at least one processing unit of a computer, the program comprising sets of instructions for:
    receiving an image in a backend system;
    sending the image to an optical character recognition (OCR) component, and in accordance therewith, receiving a plurality of characters recognized in the image;
    sequentially processing the characters with a recurrent neural network to produce a plurality of outputs for each character;
    sequentially processing the plurality of outputs for each character with a masking neural network layer, and in accordance therewith, generating a first plurality of probabilities, wherein each probability corresponds to a particular character in the plurality of characters; and
    selecting a second plurality of adjacent probabilities from the first plurality of probabilities that are above a threshold; and
    translating the second plurality of adjacent probabilities into output characters.

10. The non-transitory machine-readable medium of claim 9 wherein the output characters correspond to a one of a plurality of different data types in the image.

11. The non-transitory machine-readable medium of claim 10 wherein the image is a receipt, and wherein the data types comprise one of a purchaser name, a vendor name, a vendor street address, a vendor city, a Tax ID, an invoice number, a last 4 digits of credit-card number, or a vendor phone number.

12. The non-transitory machine-readable medium of claim 9 wherein each character processed by the recurrent neural network produces an output vector, and wherein the masking layer performs a dot product of each output vector with a weight set to produce said each probability corresponding to a particular character.

13. The non-transitory machine-readable medium of claim 9 wherein the first plurality of probabilities comprise values between zero (0) and one (1), and wherein the second plurality of adjacent probabilities comprise a contiguous set of probability values near one (1).

14. The non-transitory machine-readable medium of claim 13 further comprising:
- detecting one or more probabilities on first and second ends of the contiguous set of values near one having intermediate values;
- extracting characters corresponding to the contiguous set of probability values and corresponding to one or more probability values before or after the contiguous set of probability values;
- comparing the extracted characters against a data type format to determine if the extracted characters match the data type format; and
- increasing or decreasing a number of characters before or after the contiguous set to be extracted until the extracted characters match the data type format.

15. A computer system comprising:
- a processor; and
- a non-transitory machine-readable medium storing a program executable by the processor, the program comprising sets of instructions for:
- receiving an image in a backend system;
- sending the image to an optical character recognition (OCR) component, and in accordance therewith, receiving a plurality of characters recognized in the image;
- sequentially processing the characters with a recurrent neural network to produce a plurality of outputs for each character;
- sequentially processing the plurality of outputs for each character with a masking neural network layer, and in accordance therewith, generating a first plurality of probabilities, wherein each probability corresponds to a particular character in the plurality of characters; and
- selecting a second plurality of adjacent probabilities from the first plurality of probabilities that are above a threshold; and
- translating the second plurality of adjacent probabilities into output characters.

16. The computer system of claim 15 wherein the output characters correspond to one of a plurality of different data types in the image.

17. The computer system of claim 16 wherein the image is a receipt, and wherein the data types comprise one of a purchaser name, a vendor name, a vendor street address, a vendor city, a Tax ID, an invoice number, a last 4 digits of credit-card number, or a vendor phone number.

18. The computer system of claim 15 wherein each character processed by the recurrent neural network produces an output vector, and wherein the masking layer performs a dot product of each output vector with a weight set to produce said each probability corresponding to a particular character.

19. The computer system of claim 15 wherein the first plurality of probabilities comprise values between zero (0) and one (1), and wherein the second plurality of adjacent probabilities comprise a contiguous set of probability values near one (1).

20. The computer system of claim 19 further comprising:
- detecting one or more probabilities on first and second ends of the contiguous set of values near one having intermediate values;
- extracting characters corresponding to the contiguous set of probability values and corresponding to one or more probability values before or after the contiguous set of probability values;
- comparing the extracted characters against a data type format to determine if the extracted characters match the data type format; and
- increasing or decreasing a number of characters before or after the contiguous set to be extracted until the extracted characters match the data type format.

* * * * *